US012805458B2

(12) United States Patent
Flach et al.

(10) Patent No.: US 12,805,458 B2
(45) Date of Patent: Nov. 24, 2026

(54) IRRIGATION AND DRAINAGE DEVICE AND/OR WATER STORAGE DEVICE, PREFERABLY FOR MANAGING WATER, IN PARTICULAR IRRIGATION OF (GREEN) SPACES AND/OR PLANTS

(71) Applicant: ACO AHLMANN SE & CO. KG, Büdelsdorf (DE)

(72) Inventors: Christian Flach, Osterrönfeld (DE); Axel Leybold, Kiel (DE); Paul Lingner, Kiel (DE); Arne Meincke, Osdorf (DE); Jan Mieze, Kiel (DE); Anja Sievers, Rendsburg (DE)

(73) Assignee: ACO AHLMANN SE & CO. KG, Budelsdorf (DE)

( * ) Notice: Subject to any disclaimer, the term of this patent is extended or adjusted under 35 U.S.C. 154(b) by 342 days.

(21) Appl. No.: 18/044,814

(22) PCT Filed: Sep. 13, 2021

(86) PCT No.: PCT/EP2021/075067
§ 371 (c)(1),
(2) Date: Mar. 10, 2023

(87) PCT Pub. No.: WO2022/053667
PCT Pub. Date: Mar. 17, 2022

(65) Prior Publication Data
US 2023/0397550 A1 Dec. 14, 2023

(30) Foreign Application Priority Data
Sep. 14, 2020 (DE) ..................... 10 2020 123 914.9

(51) Int. Cl.
*A01G 25/16* (2006.01)
*E03B 1/04* (2006.01)
*E03F 1/00* (2006.01)

(52) U.S. Cl.
CPC .............. *A01G 25/16* (2013.01); *E03B 1/041* (2013.01); *E03F 1/002* (2013.01); *E03B 2001/047* (2013.01)

(58) Field of Classification Search
None
See application file for complete search history.

(56) References Cited

U.S. PATENT DOCUMENTS 5,192,426 A * 3/1993 DeCoster .................. E03B 1/04 210/170.07
5,288,412 A * 2/1994 Voorhees .................. C02F 9/00 250/435

(Continued)

FOREIGN PATENT DOCUMENTS

AU 2006100165 A4 4/2006
CN 109518758 A 3/2019

(Continued)

OTHER PUBLICATIONS

Examination Report issued in corresponding German Patent Application No. 10 2020 123 914.9; Dated: Jul. 21, 2021.

(Continued)

*Primary Examiner* — Ariel Mercado-Vargas
(74) *Attorney, Agent, or Firm* — Chrisman Gallo Tochtrop LLC

(57) ABSTRACT

The invention relates to an irrigation and drainage device and/or water storage device. At least one water-collection device is designed to collect and store water. The water-collection device is in direct or indirect fluid connection with a buffer (tank) and a storage reservoir. The buffer (tank) and/or the storage reservoir are designed to store water and to make the stored water available for use, for example to release it into an irrigation pipe network. At least one control unit is designed to receive and/or acquire environmental data, in particular to acquire these data by means of at least (Continued)

one sensor, and based on the environmental data, using at least one actuator, to make available for use a water volume flow from the buffer (tank) and from the storage reservoir to control it in the irrigation pipe network.

20 Claims, 2 Drawing Sheets

(56) References Cited

U.S. PATENT DOCUMENTS

| | | | | |
|---|---|---|---|---|
| 5,810,510 | A | 9/1998 | Urriola | |
| 6,648,549 | B1 | 11/2003 | Urriola | |
| 8,141,584 | B1 * | 3/2012 | Ellyson | E03B 7/12 137/395 |
| 8,671,969 | B2 | 3/2014 | Dresselhaus et al. | |
| 10,132,083 | B1 * | 11/2018 | Casey | E03B 1/044 |
| 10,980,189 | B1 * | 4/2021 | Warmerdam | A01G 9/033 |
| 11,638,403 | B2 * | 5/2023 | Lefers | A01G 9/247 47/58.1 R |
| 2002/0046569 | A1 * | 4/2002 | Faqih | B01D 5/009 62/93 |
| 2009/0293354 | A1 | 12/2009 | Goldberg et al. | |
| 2011/0044760 | A1 * | 2/2011 | Larach | E03F 1/005 405/52 |
| 2011/0088315 | A1 | 4/2011 | Donoghue | |
| 2011/0174706 | A1 | 7/2011 | Russell | |
| 2011/0313577 | A1 * | 12/2011 | Anderson | B01D 5/0051 700/284 |
| 2013/0025686 | A1 * | 1/2013 | Norton | F04B 37/14 137/1 |
| 2018/0220600 | A1 * | 8/2018 | Russell | E03B 1/04 |
| 2019/0307083 | A1 * | 10/2019 | Henry | E02B 13/00 |
| 2020/0189941 | A1 * | 6/2020 | Kumar | B01D 61/025 |
| 2020/0260669 | A1 * | 8/2020 | Kim | A01G 7/045 |
| 2023/0287633 | A1 * | 9/2023 | Picard | E01C 13/083 |

FOREIGN PATENT DOCUMENTS

| | | | |
|---|---|---|---|
| DE | 102005026644 | A1 | 12/2006 |
| DE | 102007030305 | A1 | 11/2008 |
| DE | 102008049297 | A1 | 5/2010 |
| DE | 202011102700 | U1 | 12/2011 |
| DE | 102018128443 | A1 | 5/2020 |
| RU | 2467560 | C2 | 7/2012 |
| WO | 2005026053 | A2 | 3/2005 |
| WO | 2009133405 | A1 | 11/2009 |
| WO | 2015035444 | A1 | 3/2015 |

OTHER PUBLICATIONS

International Search Report issued in corresponding International PCT Application No. PCT/EP2021/075067; Dated: Jan. 10, 2022.

Office Action issued in corresponding Chinese Patent Application No. 202180062598.5; Dated: Jan. 25, 2025.

Office Action issued in corresponding Russian Patent Application No. 2023 108 870; Mailing Date: Nov. 10, 2023.

Decision of Rejection issued in corresponding Chinese Patent Application No. 20210062598.5; Dated: Aug. 29, 2025.

Hualan Design, et al.; Sponge City Engineering Design Atlas, Low Impact Development (LID) Rainwater Control and Utilization; Apr. 30, 2016, pp. 76-79, (English translation of the abstract and drawings).

Zhichen,et al.; Solar Water Heater; Oct. 31, 2022, p. 87 (English translation of the abstract).

Examination Report issued in corresponding Indian Patent Application No. 202327025896; Mailing Date: Jun. 2, 2026.

* cited by examiner

IRRIGATION AND DRAINAGE DEVICE AND/OR WATER STORAGE DEVICE, PREFERABLY FOR MANAGING WATER, IN PARTICULAR IRRIGATION OF (GREEN) SPACES AND/OR PLANTS

The invention relates to an irrigation and drainage device and/or water storage device, preferably for irrigating green areas and/or plants according to claim 1.

In the context of climate change, extreme weather events are increasing globally. This can already be seen in certain regions as a trend: dry periods are becoming drier and in rainy periods more and more precipitation falls in a short period of time in the form of heavy rain. In the dry periods, the soil naturally dries out because there is no precipitation. The precipitation of the heavy rain in the rainy periods only helps to a limited extent against the dry soil—because a large amount of water in a short time often cannot be absorbed by the soil, at least often not completely. A large part of the water from the heavy rain, which accumulates on the dry soil due to the large amount of precipitation, evaporates or enters the environment—for example in rivers and/or the sewer system—before it can seep into the soil to sufficiently soak through it. This intensifies the effect of the soil drying out and can sometimes result in plant death because the plants can no longer be adequately supplied with water and/or nutrients from the soil.

AU 2006 100 165 A4 discloses a method for distributing rainwater for irrigation using an existing urban infrastructure. Such a system is perceived as comparatively inflexible, since on the one hand local irrigation needs are not taken into consideration and on the other hand the existing infrastructure is not adaptable to the specific local situation. In this respect, such a system is also considered to be in need of improvement with regard to a precipitation yield.

The object of the invention is to provide an irrigation and drainage device and an irrigation and drainage method that makes it possible to collect water, for example rainwater, in a simple manner and to keep it available for controlled release in dry periods.

In particular, the object is achieved by an irrigation and drainage device and/or water storage device, preferably for managing water, in particular irrigation of (green) areas and/or plants, wherein the device comprises the following:

at least one water-collection device designed to collect and/or store water, wherein the water-collection device is in direct or indirect fluid connection with a buffer (tank) and/or a storage reservoir, wherein the buffer (tank) and/or the storage reservoir is/are designed to store water and to make the stored water available for use, for example to release it into an irrigation pipe network;

at least one control unit, which is designed to receive and/or acquire environmental data, in particular to acquire these data by means of at least one sensor, and based on the environmental data, using at least one actuator, for example a control valve, to make available for use a water volume flow from the buffer (tank) and/or from the storage reservoir, for example to control it in the irrigation pipe network.

An essential point of the invention is to store rainwater for dry periods as well as to buffer heavy rain events and to release the collected water directly to plants and/or green areas depending on the water requirement acquired by sensors and/or based on weather data received from a weather data provider. In addition to irrigating plants and/or green spaces, the evaporation of the water released also results in a reduction in heat, which is particularly valuable in inner-city areas. Depending on the water requirements of the plants and/or the green areas, the water volume flow can be controlled. This is to be understood to mean that when the soil is detected as dry, actuators are controlled or regulated in such a way that more water (i.e., a higher water volume flow) is correspondingly introduced into the irrigation pipe network. If the soil is sufficiently supplied with water, the actuator can be controlled or regulated in such a way that less water or no water (i.e., a low water volume flow or a water volume flow equal to 0.0 L/min) is introduced into the irrigation pipe network. In case of coming heavy rain events, the water-storing elements of the irrigation and drainage system are to be emptied in order to provide buffer storage for the heavy rain. Furthermore, the irrigation and drainage device is to be visible—designed to be perceptible to passers-by—and possibly is to be able to inform passers-by interactively and/or offer the passers-by the opportunity to actively support the irrigation in order to possibly awaken environmental awareness in the passers-by.

Another significant point here is both an information connection—for example via radio—and a fluid connection between the individual (modular) components or water collection devices and/or buffer and storage reservoir of the irrigation and drainage device. By exchanging information between the individual components and the control unit (e.g., filling levels, temperature, water quality, soil moisture, etc.), the water can be routed intelligently, i.e., as required, into the irrigation pipe network/to the respective irrigation zones. For this purpose, a water requirement is determined directly in the irrigation zones using a large number of networked sensors. By means of these environmental data, the irrigation or drainage is controlled accordingly in order to optimize irrigation.

Environmental data are to be understood as data relating to the (immediate) local environment of the irrigation and drainage device. These can include data measured by the sensors with respect to soil moisture of an irrigation zone and/or an amount of precipitation and/or received weather forecast data.

In particular, physical and/or chemical and/or weather or climate sensors can be used as sensors. In this way, for example, temperature, salinity, level, turbidity, or a pH value can be determined. It is possible to use inductive and/or capacitive sensors, flow rate sensors, optical and acoustic sensors, rain gauges, rain sensors, humidity sensors, infrared and UV sensors, position sensors, vibration sensors, GPS sensors, pressure sensors, mechanical sensors, and sensors for monitoring the actuators, e.g., Hall sensors, read contacts, ammeters/voltmeters, tachometers, counters, oscillation sensors, and wave damping sensors, wind sensors, particulate matter, sulfur dioxide, NOx and SOx and ozone sensors.

If the water is no longer suitable for use, for example, excessively high salinity and/or other contamination, or because storage volume is required for an upcoming heavy rain event/flooding, it may be necessary to empty the tanks/storage tanks in advance actively (using a pump) or passively.

A water volume flow is to be understood as a water volume per unit of time—for example 0.1 L/min (liters per minute).

Direct or indirect fluid connection between the water collection device or a precipitation collection device and the buffer or buffer tank and/or storage reservoir is to be understood to mean that further fluid-conducting and/or fluid-processing devices—such as a water purification device—can (but do not have to) be connected between a water collection device and the buffer and/or storage reservoir.

In one embodiment, the water in the water collection device (10, 20, 30, 40, 64) and/or the (buffer) tank (60) and/or the storage reservoir is supplied by rain, drainage, gutters, point drains, roof drainage, area drainage, wells, or other water intake devices, desalination plants, ambient humidity, fresh water mains/water supply, surface water. Subsequent expansion is made possible by a modular design of the irrigation and drainage device and/or water storage device. In addition, precipitation can be effectively collected with a large number of (different) water collection devices. At the same time, due to the modularity, an optimal adaptation to a local situation can take place in order to collect and/or store as much precipitation as possible.

In one embodiment, the irrigation and drainage device has a water purification device that is designed to purify water that can be supplied from the at least one water collection device, in particular by sedimentation and/or filtering and/or adsorption and/or absorption, preferably before the water is supplied to the buffer and/or the storage reservoir.

A (pre-)purification of the water makes it possible on the one hand to provide clean water in the irrigation network. On the other hand, deposits in the irrigation pipe network or in the other water-carrying or water-storing components are avoided by purifying the water. This can prevent clogs. Ultimately, purification reduces maintenance work, saves costs, and optimizes the durability of the irrigation and drainage device.

In one embodiment, the buffer and/or a basin and/or a (block) ditch system is at least partially encased using a sealing membrane, in particular geotextile.

A modular (block) ditch system or ditch system preferably produced from plastic enables a stable and structurally simple option to construct the buffer or a buffer tank cost-effectively. A height is also variable and can be adapted to a terrain upper edge. Using a modular principle, almost any installation situation can be taken into consideration. Due to to the system architecture, a (block) ditch system offers high stability and high strength. The (block) ditch system can be installed under green areas, public paths and squares, and also automobile parking spaces. An additional use of one or more layers of geotextile under or around the (block) ditch system can protect the (block) ditch system. The geotextile can be used as a sealing membrane to seal the (block) ditch system and/or as a root protection. Alternatively or additionally, basins can be used to collect or store water. These are comparatively inexpensive.

In one embodiment, the irrigation pipe network comprises multiple irrigation pipes, wherein each irrigation pipe is designed to release water in a corresponding irrigation zone, preferably by means of an open end and/or a respective end region which is perforated at least in sections and/or by means of perforated sections.

This makes it possible for the irrigation to take place directly via a permanently laid pipeline system to the respective irrigation zones or planting areas where the water is required for irrigating the plants. Irrigation zones can be flat green areas (for example so-called planting islands) as well as individual tree planting pits or tree planting pits connected to one another by substrate spaces. This promotes the growth of plants in the irrigation zones. On the other hand, missing/absent precipitation can be replaced with water from the irrigation and drainage device in order to supply the plants in the irrigation zones with sufficient water during dry periods. In general, the evaporation of the water in the irrigation zones also results in a reduction in heat, which is particularly valuable in inner-city areas.

In one embodiment, the irrigation and drainage device has at least one electric pump; this electric pump is preferably arranged on the buffer side. Alternatively or additionally, a manual pump or a capstan or a hydraulic ram, such as a hand pump, can be provided. The manual pump is preferably arranged at the storage reservoir or in its vicinity. The at least one electric pump and/or the hand pump are designed to pump the water from the buffer into the storage reservoir and/or into the irrigation pipe network.

By using an electronic pump, the water can be regulated or controlled and/or pumped from the buffer to the storage reservoir as required. This improves the handling of the irrigation and drainage device. The use of a manual pump, such as a hand pump, is also possible without a power supply—transferring the water would therefore also be possible without a power supply. In addition, a hand pump can contribute to the active assistance of the irrigation of the plants and/or green areas by passers-by.

In one embodiment, the control unit is designed to acquire the environmental data by means of a large number of sensors, preferably soil moisture sensors, via a sensor interface. In particular, the environmental data comprise values for a soil moisture content in an irrigation zone here. Based on these environmental data or soil moisture sensor data, the water volume flow from the buffer and/or the storage reservoir is controlled by means of the actuator.

The control unit/controller can consist of local electronic components (hardware and software) and/or decentralized control software. Data communication between local and decentralized components can be made possible by wired or radio-based technologies (data exchange). The collection and processing can take place in a database structure, in particular a data cloud, which communicates with the control unit.

Irrigation by means of the irrigation and drainage device takes place directly in the respective irrigation zones. A measurement of the water content of the soil or the plant substrate or the soil moisture within the irrigation zone can be carried out using soil moisture sensors. This enables a needs-based water supply to the irrigation zones. If it is determined that an irrigation zone is excessively dry, this irrigation zone can be (more strongly) irrigated.

In one embodiment, the control unit is designed to receive environmental data via a network interface. In particular, the environmental data include weather data or weather forecast data for a location of the irrigation and drainage device, which are preferably provided by a weather data provider. Based on these environmental data or weather forecast data, the water volume flow from the buffer and/or from the storage reservoir is controlled by means of the at least one actuator.

This enables a needs-based water supply to the irrigation zones. If the weather forecast contains a forecast of a long-lasting drought, the control unit of the irrigation and drainage device can hold back water for this purpose and/or inform the responsible maintenance personnel that water may have to be (manually) refilled. If the weather forecast contains a prediction of precipitation, the irrigation zones may not be irrigated and/or the resulting irrigation may accordingly be less in order to reserve water in the irrigation and drainage device. On the other hand, if (heavy) precipitation is announced, the water storage (buffer and/or storage reservoir) can be emptied in order to make buffer storage volume available for the corresponding precipitation.

In one embodiment, the at least one precipitation collection device comprises at least one inflow control valve, which is designed to control and/or prevent an inflow from the at least one precipitation collection device to the buffer by means of the control unit.

The use of an inflow control valve makes it possible, for example when the buffer and/or storage reservoir is full, for the water that is collected using the at least one water collection device to initially remain in the water collection device, since if it was passed on to the buffer and/or the storage reservoir, these would overflow and that water would accordingly be lost. In this way, a storage volume of a water collection device can temporarily increase the total storage volume of the irrigation and drainage device.

In one embodiment, the at least one water collection device comprises conventional gutters, point drains (surface drainage system), and/or at least one roof collection component, for example for flat roofs, which is preferably arranged on a house roof. Alternatively or additionally, the at least one water collection device comprises at least one floor collection component, preferably formed from floor elements that are perforated at least in sections and/or are water-permeable at least in sections with water guiding structures arranged underneath.

This makes it possible for the irrigation and drainage device to be used in many (almost all) building situations—regardless of the location. Both on house roofs and on or in floors. The irrigation and drainage device can either be retrofitted, i.e., attached or installed on existing house roofs and/or in corresponding floor areas, or planned and installed specifically for new building complexes having houses and/or green areas in these houses and/or green areas. A precipitation collection quantity can be optimized especially when (simultaneously) using different or several water collection devices. Overall, this optimizes the irrigation of the irrigation zones and thus the irrigation and drainage device.

In one embodiment, the storage reservoir and/or the buffer has fill level sensors for determining a water fill level and/or temperature sensors for determining a water temperature and/or conductivity sensors for determining a water conductivity, in particular with regard to a salinity of the water, and the respective sensors are also designed to transmit the acquired sensor data to the control unit and the control unit is designed to control the water volume flow from the buffer and/or from the storage reservoir by means of at least one actuator and/or by means of at least one pump based on the sensor data.

The use of temperature sensors and/or conductivity sensors makes it possible to optimize the water quality of the water that is used for the irrigation, and thus ultimately the irrigation and drainage device. For example, water temperatures that are excessively high or excessively low can damage plants upon irrigation. An excessively high salinity (for example road salt) in the water is equally harmful to the plants. If the conductance of the water determined by means of a conductivity sensor is excessively high, the water can be drained into the sewer system, for example. Fill level sensors can additionally log data about water fill levels and optimize the water distribution within the irrigation and drainage system. In addition, the water volume flow that is released into the irrigation zones can be measured and/or controlled by means of the fill level sensors. Alternatively or additionally, physical and/or chemical sensors can be used in the at least one water collection device and/or in the buffer and/or in the storage reservoir. In this way, for example, temperature, salinity, level, turbidity, or a pH value of the water can be determined. It is possible to use inductive and/or capacitive sensors, flow rate sensors, optical and acoustic sensors, infrared and UV sensors, position sensors, vibration sensors, GPS sensors, pressure sensors, mechanical sensors, and sensors for monitoring the actuators, e.g., Hall sensors, read contacts, ammeters/voltmeters, tachometers, counters, oscillation sensors, and wave damping sensors, wind sensors, particulate matter, sulfur dioxide, NOx and SOx and ozone sensors in order to optimize the irrigation and drainage device or the irrigation and drainage.

In one embodiment, the storage reservoir is designed as an elevated tank such that the water release or the control of the water volume flow from the storage reservoir into the irrigation pipe network can be carried out without pumps and/or exclusively by the at least one actuator. For this purpose, the actuator can be designed, for example, as a control valve or as an active throttle. The elevated tank can also be designed to be transparent for visualization purposes, in order to visualize the internal water level.

This enables the water to be released from the storage reservoir into the irrigation pipe network solely "passively" by the weight of the water. As a result, the irrigation and drainage device is cost-effective and requires little maintenance.

In one embodiment, the irrigation and drainage device includes an information display device that is designed to communicate with the control unit including a data-processing unit (for example a dashboard) and to visualize information, for example with respect to soil moisture, water fill levels, amount of precipitation, or the like, in particular operating states.

An information display device enables the responsible maintenance personnel to have a corresponding overview of the relevant operating data of the irrigation and drainage device. The information device can also display location-related irrigation and/or precipitation information for passers-by. The information display device can be designed as a (weatherproof) outdoor display, for example.

In particular, the object of the invention is also achieved by irrigation and drainage methods and/or water storage methods, preferably for the management of water, in particular irrigation of (green) areas and/or plants, wherein the method comprises the following steps:

- collecting and/or storing water using at least one water collection device and routing the collected water into a (buffer) tank and/or into a storage reservoir;
- receiving and/or acquiring environmental data, preferably comprising values for soil moisture in irrigation zones and/or a quantity of precipitation in relation to the location of the (green) areas to be irrigated and/or plants or the irrigation zones, using a control unit;
- controlling a water volume flow from the buffer and/or the storage reservoir into an irrigation pipe network as a function of the environmental data in order to make a quantity of water available for use, for example to meter it for the (green) areas to be irrigated and/or plants in the irrigation zones according to the environmental data.

This results in the same advantages as have already been described in connection with the irrigation and drainage device.

In one embodiment, the irrigation and drainage method comprises a step of increasing the water volume flow when the control unit detects by means of a sensor, preferably a soil moisture sensor, that a water content in a corresponding irrigation zone is below a limiting value, and/or

- a step of reducing the water volume flow if the control unit detects by means of the sensor, preferably a soil moisture sensor, that a water content in a corresponding irrigation zone is above the limiting value.

This ensures that the optimal amount of water is always provided in the irrigation zones, so that plants and/or green areas can be optimally supplied.

In one embodiment, the irrigation and drainage method comprises a step of actively or passively emptying the buffer and/or the storage reservoir, preferably by emptying it into the sewer system, if

- the control unit receives environmental data containing information announcing heavy rain, and/or
- the control unit detects that the salinity of the water exceeds a limiting value by means of a conductivity sensor within the buffer and/or the storage reservoir.

This ensures that the buffer and/or the storage reservoir are optimally filled. If a large amount of precipitation is imminent, sufficient buffer volume is provided so that fresh water can be absorbed. Water that is excessively salty or generally contaminated can be discharged into the sewer system instead of being used for irrigation, since this could potentially have a negative effect on the plants.

Energy harvesting systems, e.g., photovoltaics, wind, thermal differences, piezo elements, generators of any kind can be used for the energy supply, e.g., for the control unit, sensors, actuators. The energy can be stored, for example, via rechargeable batteries.

Further advantageous embodiments result from the dependent claims.

The invention is also described hereinafter with regard to further features and advantages using exemplary embodiments which are explained in more detail using an illustration.

In the figures.

In the following description, the same reference numbers are used for identical and identically acting parts.

Figure 1:
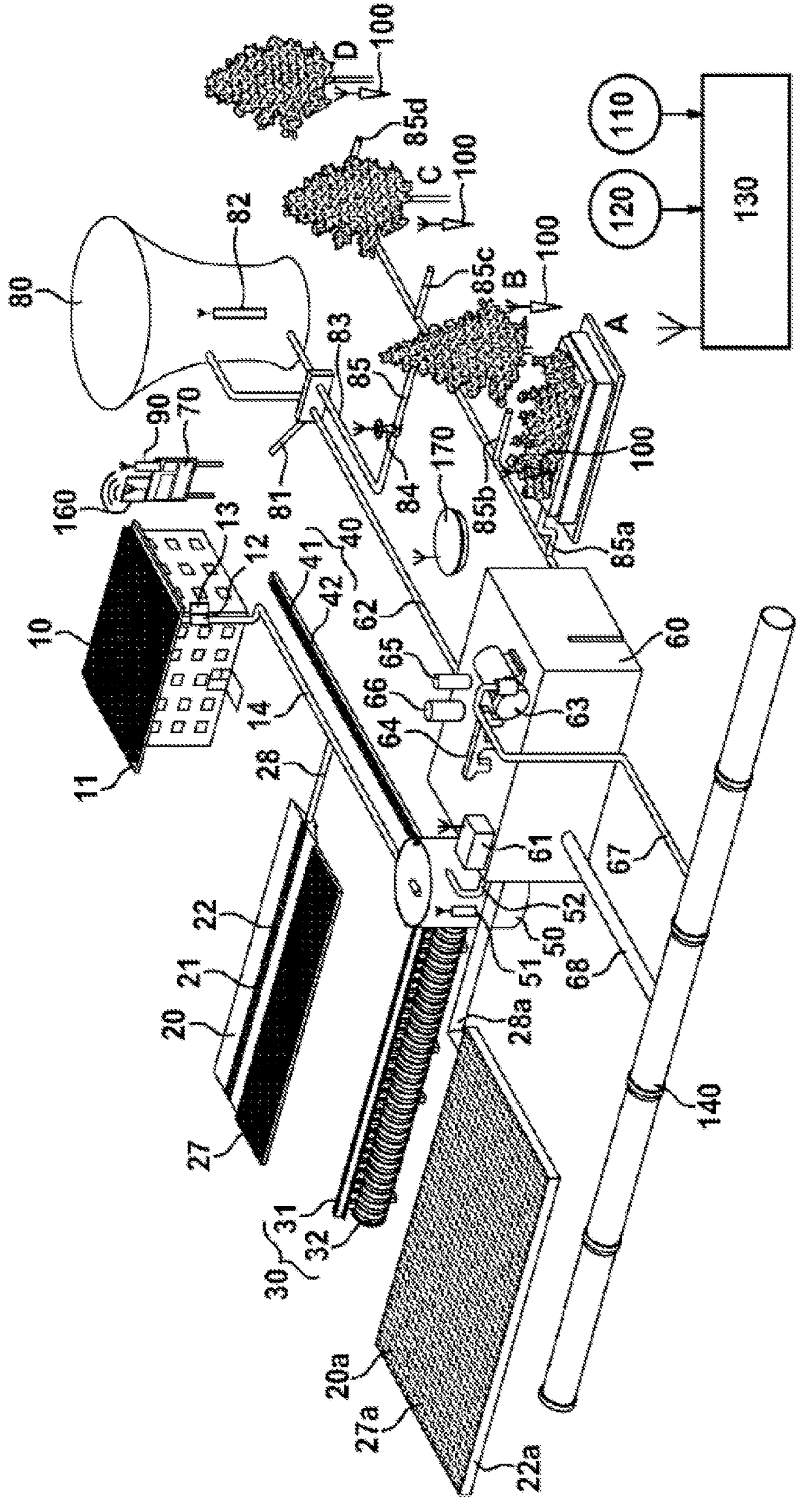
FIG. 1 shows a first exemplary embodiment of an irrigation and drainage device including a roof collection device and a storage reservoir.

In the exemplary embodiment according to FIG. 1, multiple types of water-collection devices are shown, which are modular and linked to one another in a fluid-conducting manner and electronically, indirectly or directly.

The water collection device 10 is a roof collection device 10, which is arranged on a house roof 11, combined here with a radio-networked optical level sensor 13 and radio-controlled inflow control valve 12. The level sensor 13 and the inflow control valve 12 can communicate with a sensor interface 110 of a control unit 130 and can be controlled by the control unit 130. The roof collection device 10 can preferably be planted. The roof collection device 10 preferably consists of a modular, flat, geocellular storage cavity. Multiple layers of the flat sheets allow for a larger storage cavity of the roof collection device 10 to be created. A structural height can vary from 85-165 mm.

In addition, multiple water collection devices 20, 20*a*, 30, 40, 64 are shown, which are designed as ground collection devices 20, 20*a*, 30, 40, 64 of the irrigation and drainage device. In an exemplary embodiment according to FIG. 1, the ground collection devices are, for example, a retention channel 30 and/or a drainage channel 40 introduced into the ground. Wherein the retention channel 30 and the drainage channel 40 each have sections of water-permeable ground elements 31, 41—for example lattice structures or perforated structures, through which water can enter. Underneath are corresponding water guiding structures 32, 42 in each case, which are designed to guide the water that has entered accordingly.

The ground collection devices in the embodiment according to FIG. 1 comprise a lawn collection device 20. The lawn collection device has green area elements 27 (for example grass honeycombs) which form the ground. In addition, the lawn collection device has a channel 22 below the ground or in the ground. The channel 22 can have water-permeable ground elements 21 on its surface. The water can be guided from the gutter 22 in the direction of the buffer 60 via corresponding pipes 28 of the lawn collection device 20.

Alternatively or additionally, the ground collection devices in the exemplary embodiment according to FIG. 1 can have a perforated concrete slab collection device 20*a*. Rainwater can penetrate through a perforation in floor-forming concrete slabs 27*a*. Below the perforated concrete slabs 27*a* is a water guiding structure designed as a channel 22*a*. The channel 22*a* can supply the rainwater to the buffer 60 via corresponding pipes 28*a*.

In the exemplary embodiment according to FIG. 1, the water from the water collection devices 10, 20, 20*a*, 30, 40 reaches a water purification device 50. The water purification device 50 can purify the water, in particular by sedimentation. In addition to solely sedimentation, filtration and adsorption, for example via activated carbon, can also be implemented within the water purification device 50. According to the exemplary embodiment from FIG. 1, the water purification device 50 has a fill level sensor 51 for determining a water fill level of the water purification device 50. The fill level sensor 51 transmits the acquired data relating to a water fill level to the sensor interface 110 of a control unit 130. In alternative embodiments, the water purification device 50 can include further sensors (not shown). For example, temperature sensors and/or conductivity sensors and/or sediment level sensors, which also transmit their respective data to the control unit 130.

From the water purification device 50, the purified water reaches a buffer 60. In one embodiment, the (buffer) tank 60 is constructed from a modular (block) ditch system, preferably made of plastic (polypropylene).

A modular (block) ditch system can be based on basic ditch elements (blocks), which are laid in a group using a plug-in system. As a result, the structural strength and the (assembly) handling of the (block) ditch system can be significantly increased. The individual elements can be assembled on site in advance to form a connected block system. Such a ditch system can be designed both for block infiltration and for block storage/retention. For example, as block storage below traffic areas, driveways, or public areas.

The stability is preferably increased by a large number of columns within the ditches. The columns can also be filled with water, so that a storage coefficient of the ditches of up to 95% can be achieved.

The use of polypropylene for the ditches also provides a robust and corrosion-resistant foundation for longevity of the system.

Furthermore, the buffer and/or the ditches of the (block) ditch system can have inspection accesses—for example for an inspection camera and/or for cleaning devices.

In the embodiment shown, the buffer 60 is below a ground surface.

The buffer 60 is equipped with a drain pump 67 and a pipe such that water from the buffer can be actively discharged into the sewer system 140. Alternatively or additionally, an overflow pipe 68 can be provided in order to prevent the buffer 60 from overflowing. In the exemplary embodiment according to FIG. 1, the overflow pipe 68 of the buffer is connected to the sewer system 140.

A sensor unit 61 of the buffer 60 comprises multiple sensors, for example a temperature sensor for determining a water temperature within the buffer and/or a buffer fill level sensor for determining a buffer fill level and/or a conductivity sensor for determining a water conductivity, in particular with regard to a salinity and/or a sedimentation sensor for acquiring sedimentation values of the water within the buffer 60.

The sensor unit 61 of the buffer 60 can transmit the acquired data to the sensor interface 110 of the control unit 130 via radio signals and/or in a wired manner.

For one or more of the ground collection devices 10, 20, 20*a*, 30, 40 and/or the buffer 60 and/or for the water purification device 50, (smart) covers 170 can be used to close a passage opening.

The passage opening can, for example, allow access or entry to the subterranean elements.

The smart cover 170 has at least one antenna such that signals can be sent and received through the transmission and reception opening, wherein the antenna of the cover 170 is connected to at least one electrical line.

The electrical line of the smart cover 170 can be connected to sensors and/or actuators of at least one of the ground collection devices 10, 20, 20*a*, 30, 40 and/or the buffer 60 and/or the water purification device 50.

The antenna of the smart cover 170 passes on these signals (above ground) and wirelessly to the control unit 130 in such a way that a signal transmission quality of sensor-acquired values within the ground collection device and/or the buffer to the control unit 130 is optimized.

The water is made available for irrigation via an electric pump 63 and/or via a manual pump such as a hand pump 81.

According to the exemplary embodiment from FIG. 1, the water reaches an elevated storage reservoir 80 via the electric pump 63 and/or via the hand pump 81 via a corresponding connecting pipe 62.

The electric pump 63 of the buffer 60 can also comprise a solar and/or wind powered pump system.

A wall of the storage reservoir 80 can be transparent (in sections) or partially transparent (in sections) in order to be able to acquire the internal water level directly.

In addition, the storage reservoir 80 comprises a storage reservoir fill level sensor 82 which is designed to transmit a fill level of the storage reservoir to the sensor interface 110 of the control unit 130. The storage reservoir fill level sensor 82 also regulates the inflow.

In addition, an overflow is integrated into the storage reservoir 80 which, if necessary, returns the water to the buffer 60.

By means of the hand pump 81, passers-by can actively assist the irrigation of the green areas or fill the storage reservoir 80. Such offers are used very well, especially in areas frequented by tourists.

In principle, however, the actual irrigation is never carried out by passers-by, but always via an actuator 84 controllable by means of the control unit 130 in order to be able to ensure an optimal water supply to the irrigation zones.

If required, the buffer 60 can be manually filled with water via a filler neck 65. Alternatively or additionally, the filler neck can be connected to a water supply line, via which the buffer 60 can be filled. Manual filling can be advantageous, for example, when the weather forecast predicts a prolonged dry period, but the control unit 130 reports that the buffer 60 and/or the storage reservoir 80 have a low fill level.

In one exemplary embodiment, the buffer 60 itself can have a water collection device 64 or a direct feed structure 64 such that precipitation from the ground can seep directly into the buffer 60.

An information display device 70 can be set up, which is designed to communicate with the control unit 130 and to visualize information, for example in relation to soil moisture of the soil around the irrigation and drainage device, water levels in the irrigation and drainage device, amount of precipitation. Interactive elements can also be present on the information display device 70. Visible fill level indicators (visible in particular to passers-by) of the irrigation and drainage device can also be installed. In the exemplary embodiment according to FIG. 1, the buffer 60 has, for example, a fill level indicator 66 provided with a float.

In the exemplary embodiment according to FIG. 1, a weather station 90 is also attached to the information display device 70. This acquires local weather data such as amount of precipitation and/or ambient temperature and transmits them to the sensor interface 110 of the control unit 130, where the data from the weather station 90 can be taken into consideration when controlling the irrigation and drainage device.

The volume and/or height of the storage reservoir 80 may vary based on need and/or environment.

In this exemplary embodiment, the storage reservoir 80 is designed as an elevated tank similar to a water tower. A photovoltaic device for generating solar power can be attached to an upper side of the storage reservoir. The resulting water pressure inside the storage reservoir 80 or inside a supply line section 83 makes it possible to supply the irrigation pipe network 85 without a pump—i.e., only by opening at least one actuator 84. The design and/or the height and/or the position of the feed line section 83 of the storage reservoir 80 can be optimized with regard to the water pressure present at the actuator 84.

The green areas and/or plants are irrigated via a permanently laid irrigation pipes network 85 directly to the respective irrigation zones A-D. Wherein in this exemplary embodiment, the irrigation pipe network 85 comprises irrigation pipes 85*a*-85*d* for this purpose.

Irrigation zones A-D can be flat green areas (for example so-called planting islands) as well as individual tree planting pits or tree planting pits connected to one another by substrate spaces. Both applications involve the natural capillarity of the plant substrate, since capillarity helps the water get to where it is needed by the plants.

In the respective irrigation zones A-D, soil moisture sensors 100 acquire a soil moisture or a soil water content of the irrigation zones A-D and transmit the acquired data to the sensor interface 110 of the control unit 130.

The control unit 130 receives both the soil moisture values determined locally via the soil moisture sensors 100 via the sensor interface 110 and weather data from corresponding providers via a network interface 120. The network interface can be an Internet network interface, for example.

The control unit 130 can comprise a computing unit and an information interface for the maintenance personnel. The control unit 130 comprises the underlying control logic of the irrigation and drainage device:

Heavy rain likely: Buffer 60 and/or storage reservoir 80 (or possibly also water collection devices) are actively or passively emptied into the sewer system or optional other storage devices.

Drought likely: Water is retained and/or a message is sent to maintenance personnel to manually fill the buffer and/or storage reservoir.

Buffer 60 and/or storage reservoir 80 are empty or contain only a small amount of water and/or the soil moisture is excessively low: warning message (for example via e-mail to maintenance personnel and/or a corresponding message to an app), that buffer 60 and/or storage reservoir have to be refilled.

Water in tanks is excessively salty (for example due to road salt): water is discharged into the sewer system.

Irrigation of the irrigation zones if the soil moisture of the corresponding irrigation zone is excessively low.

Output and visualization of the environmental data such as soil moisture, amount of precipitation, etc. on the information display device 70. Under certain circumstances, a progression of the values of the environmental data over a certain period of time (for example a week) can also be visualized.

Output of maintenance notifications (for example via e-mail to maintenance personnel and/or a corresponding message to an app): notifications with respect to sedimentation in water purification device 50 or buffer 60, notifications with respect to filter statuses, notifications with respect to failures of sensors and/or actuators or, if applicable, battery levels of the sensors.

A system network of the control unit 130 consists of sensors and/or sensor units, actuators, pumps, and/or circuits that are used for processing and passing on signals.

By means of a gateway 160, signals from the local system network are processed on the one hand and the connection to the Internet is established on the other hand. Depending on the location conditions, the LoRaWAN or the NB-IoT radio standard or other radio standards can be used.

In addition, the control unit 130 can have a user interface which is designed to input and/or modify corresponding limiting values or target ranges for water temperatures and/or water salinity.

Figure 2:
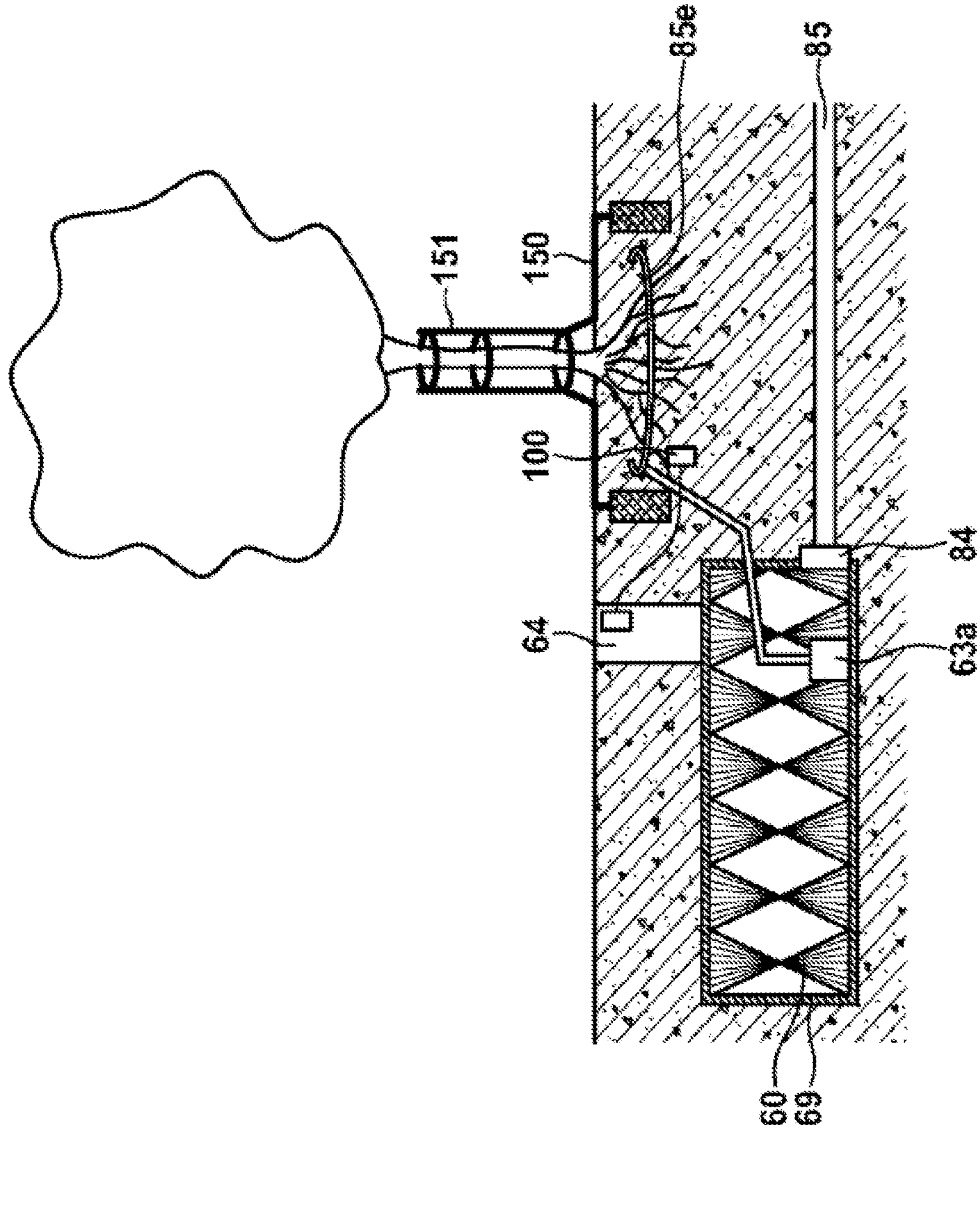
FIG. 2 shows an alternative exemplary embodiment of an irrigation and drainage device.

An alternative embodiment of the irrigation and drainage device is shown in FIG. 2. In the exemplary embodiment according to FIG. 2, the buffer 60 is used directly as a storage reservoir. In the exemplary embodiment, the irrigation and drainage device is used for at least one tree, which is protected by a tree protection grate 150 and a tree protection lattice 151.

In this exemplary embodiment, the filling of the buffer 60 takes place analogously to the previous exemplary embodiments via at least one water collection device 64.

A water collection device is shown as a direct feed structure 64 in FIG. 2. The direct feed structure 64 allows precipitation water to be introduced directly into the underground buffer 60. The buffer 60 is at least partially enveloped with at least one layer of sealing membrane 69, which on the one hand has a sealing effect and also prevents roots from growing in. The sealing membrane/geotextile 69 can consist of plastic, for example.

The soil moisture sensor 100 acquires soil moisture values for an irrigation zone and transmits these to the control unit 130 (not shown). An actuator or a control valve 84 can be opened by the control unit 130 as soon as the soil moisture sensor 100 falls below a specific value. In this way, water is routed from the buffer 60 into the irrigation pipe network 85. In the exemplary embodiment according to FIG. 2, the irrigation pipe network 85 can comprise a perforated pipe from which the water can seep into the surrounding substrate. Due to the capillary force of the optimized substrate, the water rises upward and becomes available for the plant roots in the irrigation zone.

Alternatively or additionally, a pump 63*a* controlled by the control unit 130 can introduce water into a drip tube 85*e* laid in the root area of a plant, which carries out drip irrigation.

Alternatively or additionally, a layer of rock wool can be placed within the root area. The rock wool layer is sealed with foil on the bottom and on the sides and can thus store water that has seeped in and/or that has been introduced through the irrigation pipe network 85. Plants have direct access to the reservoir via their roots.

At this point, it is to be noted that all the parts described above, viewed individually and in any combination, in particular the details shown in the drawings, are claimed to be essential to the invention. Modifications thereof are familiar to persons skilled in the art.

REFERENCE SIGNS

10 water collection device (roof collection device)
11 house roof
12 Inflow control valve
13 level sensor
20 water collection device (ground collection device or lawn collection device)
20*a* water intake device
21 water-permeable floor element
22 water guiding structure (gutter)
27 green space elements
28 line
22*a* water guiding structure (gutter)
27*a* water-permeable floor element (perforated concrete slab)
28*a* pipe
30 water collection device (floor collection device or retention channel)
31 water-permeable floor elements
32 water guiding structure (gutter)
40 water collection device (floor collection device or drainage channel)
41 water-permeable floor elements
42 water guiding structure (gutter)
50 water purification device
51 fill level sensor
60 buffer (tank)
61 sensor unit
62 connecting pipe
63 electric pump
63*a* electric pump
64 water collection device (ground collection device or direct feed structure)
65 filler neck
66 fill level indicator
67 drain pump
68 overflow pipe
69 sealing membrane (geotextile)
70 Information display device
80 storage reservoir
81 manual pump
82 storage reservoir fill level sensor
83 feed line section
84 actuator
85 irrigation pipe network
85*a*-85*d* irrigation pipes
85*e* drip tube

90 weather station
100 sensor (soil moisture sensor)
110 sensor interface
120 network interface
130 control unit
140 sewer system
150 tree protection grate
151 tree protection lattice
160 gateway
170 smart cover

The invention claimed is:

1. An irrigation and drainage device or water storage device comprising the following:

a buffer tank (60);

a storage reservoir (80);

at least one water-collection device (10, 20, 30, 40, 64) designed to collect and store water such that the water can be stored within the at least one water-collection device (10, 20, 30, 40, 64), wherein the at least one water-collection device (10, 20, 30, 40, 64) is in direct or indirect fluid connection with the buffer tank (60) or the storage reservoir (80), wherein the buffer tank (60) or the storage reservoir (80) is designed to store water and to make the stored water available for use to release it into an irrigation pipe network (85);

at least one control unit (61, 130), which is designed to receive or acquire environmental data, to acquire the environmental data by means of at least one sensor (100), and based on the environmental data, using at least one actuator to make available for use a water volume flow from the buffer tank (60) or from the storage reservoir (80) to control it into the irrigation pipe network (85);

a conductivity sensor within the buffer tank or the storage reservoir;

wherein the buffer tank or the storage reservoir is designed to empty into a sewer system when the at least one control unit detects that a salinity of the water exceeds a limiting saline value by means of the conductivity sensor;

wherein the buffer tank (60) is constructed from a modular block ditch system, wherein infiltration ditch base elements are installed in a grid pattern using a plug-in system; and wherein the modular block ditch system comprises columns configured to be filled with water such that a storage coefficient of the modular block ditch system of up to 95% can be achieved.

2. The irrigation and drainage device or water storage device as claimed in claim 1, wherein the water in the at least one water collection device (10, 20, 30, 40, 64) or the buffer tank (60) or the storage reservoir is supplied by one selected from the group consisting of rain, drainage, gutters, point drains, roof drainage, area drainage, wells, or other water intake devices, desalination plants, ambient humidity, fresh water mains/water supply, and surface water.

3. The irrigation and drainage device or water storage device as claimed in claim 1, further comprising a water purification device (50) designed to purify water that is supplied from the at least one water collection device (10, 20, 30, 40, 64) before the water is supplied to the buffer tank (60) or the storage reservoir (80).

4. The irrigation and drainage device or water storage device as claimed in claim 1, wherein the buffer tank (60) or a basin is at least partially enveloped with a geotextile sealing membrane (69).

5. The irrigation and drainage device or water storage device as claimed in claim 1, wherein the irrigation pipe network (85) comprises multiple irrigation pipes (85*a*-85*d*), wherein each irrigation pipe (85*a*-85*d*) is designed to release water in a corresponding irrigation zone (A-D) by means of an open end or a respective end region which is perforated at least in sections or by means of perforated sections.

6. The irrigation and drainage device or water storage device as claimed in claim 1, wherein at least one electric pump (63) is arranged on the buffer tank or in a vicinity of the buffer tank, or a manual pump (81) or capstan/hydraulic ram is arranged on the storage reservoir (80) or in a vicinity of the storage reservoir, wherein the at least one electric pump (63) or the manual pump (81) is designed to pump the water from the buffer tank (60) into the storage reservoir (80) or into the irrigation pipe network (85).

7. The irrigation and drainage device or water storage device as claimed in claim 1, wherein the control unit (130) is designed to acquire the environmental data comprising values for a soil moisture content in an irrigation zone (A-D), by means of a plurality of soil moisture sensors (100), via a sensor interface (110), and, based on the environmental data, to control the water volume flow from the buffer tank (60) or from the storage reservoir (80) by means of the at least one actuator (84).

8. The irrigation and drainage device or water storage device as claimed in claim 1, wherein the control unit (130) is designed to receive environmental data comprising weather data or weather forecast data for a location of the irrigation device, via a network interface (120) and, based on the environmental data, to control the water volume flow from the buffer tank (60) or from the storage reservoir (80) by means of the at least one actuator (84).

9. The irrigation and drainage device or water storage device as claimed in claim 1, wherein at least one water collection device (10, 20, 30, 40, 64) comprises at least one inflow control valve (12) which is designed to control or prevent an inflow from the at least one water collection device (10, 20, 30, 40, 64) to the buffer tank (60) by means of the control unit (130).

10. The irrigation and drainage device or water storage device as claimed in claim 9, wherein the water is stored within the at least one water-collection device (10, 20, 30, 40, 64) when the at least one inflow control valve (12) is in a position preventing the inflow from the at least one water collection device (10, 20, 30, 40, 64) to the buffer tank (60).

11. The irrigation and drainage device or water storage device as claimed in claim 1, wherein the water collection device (10, 20, 30, 40, 64) comprises conventional gutters, point drains (surface drainage system), or at least one roof collection component (10) arranged on a house roof (11), or comprises at least one ground collection component (20, 30, 40, 64) formed from floor elements (21, 27, 27*a*, 31, 42) that are perforated at least in sections or water-permeable in sections, with water guiding structures (22, 22*a*, 32, 42) arranged underneath.

12. The irrigation and drainage device or water storage device as claimed in claim 1, wherein the storage reservoir (80) or the buffer tank (60) or the at least one water collection device (10, 20, 30, 40) have fill level sensors (51, 61, 82) for determining a water fill level or temperature sensors (61) for determining a water temperature, and the respective sensors (51, 61, 82) are also designed to transmit acquired sensor data to the control unit (130) and the control unit (130) is designed to control the water volume flow from the buffer tank (60) or from the storage reservoir (80) by means of the at least one actuator (84) or by means of at least one pump (63, 67) based on the acquired sensor data.

13. The irrigation and drainage device or water storage device as claimed in claim 12, wherein the control unit (130) prevents the water volume flow from the buffer tank (60) or from the storage reservoir (80) into the irrigation pipe network (85) when the water temperature is above an upper limit or below a lower limit.

14. The irrigation and drainage device or water storage device as claimed in claim 1, wherein the storage reservoir (80) is designed as an elevated tank such that a water release or the control of the water volume flow from the storage reservoir (80) into the irrigation pipe network (85) is carried out without pumps or exclusively by the at least one actuator (84), the elevated tank is designed to be transparent for visualization purposes in order to visualize the water level.

15. The irrigation and drainage device or water storage device as claimed in claim 1, wherein an information display device (70) is designed to communicate with the control unit (130) including a data processing unit and to visualize information selected from the group consisting of soil moisture, water fill levels, and amount of precipitation in particular operating states.

16. The irrigation and drainage device or water storage device as claimed in claim 1, wherein the buffer tank (60) comprises the following:

a drain pump (67) and a drain pipe that can actively discharge water in the buffer tank (60) into the sewer system (140); and an overflow pipe (68) connected to the sewer system (140), and wherein the storage reservoir (80) comprises an overflow that returns water to the buffer tank (60).

17. An irrigation and drainage method or water storage method, wherein the method comprises the following steps:

collecting and storing water using at least one water collection device (10, 20, 30, 40, 64) such that some of the water is stored within the at least one water-collection device (10, 20, 30, 40, 64), and routing the collected water into a buffer tank (60) or into a storage reservoir (80);

receiving or acquiring environmental data comprising values for soil moisture in irrigation zones (A-D) or an amount of precipitation in relation to the location of green areas or plants to be irrigated or in relation to the irrigation zones (A-D), using a control unit (130);

controlling a water volume flow from the buffer tank (60) or from the storage reservoir (80) into an irrigation pipe network (85) as a function of the environmental data in order to make a quantity of water available for use to meter it for the green areas or plants to be irrigated or in the irrigation zones (A-D) according to the environmental data;

further comprising a step of actively or passively emptying the buffer tank (60) or the storage reservoir (80) by emptying it into a sewer system (140), when the control unit (130) detects that a salinity of the water exceeds a limiting saline value by means of a conductivity sensor within the buffer tank (60) or the storage reservoir (80);

wherein the buffer tank (60) is constructed from a modular block ditch system, wherein infiltration ditch base elements are installed in a grid pattern using a plug-in system; and wherein the modular block ditch system comprises columns configured to be filled with water such that a storage coefficient of the modular block ditch system of up to 95% can be achieved.

18. The irrigation and drainage method or water storage method as claimed in claim 17, further comprising a step of increasing the water volume flow when the control unit (130) detects by means of a soil moisture sensor (100), that a water content in a corresponding irrigation zone (A-D) is below a limiting moisture value, or a step of reducing the water volume flow when the control unit (130) detects by means of the soil moisture sensor (100), that a water content in a corresponding irrigation zone (A-D) is above the limiting moisture value.

19. The irrigation and drainage method or water storage method as claimed in claim 17, further comprising a step of actively or passively emptying the buffer tank (60) or the storage reservoir (80) by emptying it into the sewer system (140), when the control unit (130) receives environmental data containing information announcing heavy rain.

20. An irrigation and drainage device or water storage device comprising the following:

at least one water-collection device (10, 20, 30, 40, 64) designed to collect and store water such that the water can be stored within the at least one water-collection device (10, 20, 30, 40, 64), wherein the at least one water-collection device (10, 20, 30, 40, 64) is in direct or indirect fluid connection with a buffer tank (60) or a storage reservoir (80), wherein the buffer tank (60) or the storage reservoir (80) is designed to store water and to make the stored water available for use to release it into an irrigation pipe network (85);

at least one control unit (61, 130), which is designed to receive or acquire environmental data, to acquire the environmental data by means of at least one sensor (100), and based on the environmental data, using at least one actuator to make available for use a water volume flow from the buffer tank (60) or from the storage reservoir (80) to control it into the irrigation pipe network (85);

a conductivity sensor within the buffer tank or the storage reservoir;

wherein the buffer tank or the storage reservoir is designed to empty into a sewer system when the at least one control unit detects that a salinity of the water exceeds a limiting saline value by means of the conductivity sensor;

wherein the at least one water-collection device (10, 20, 30, 40, 64) or the buffer tank (60) has a smart cover (170) that closes a passage opening;

wherein the smart cover (170) has at least one antenna, and the at least one antenna can send signals wirelessly to the control unit (130);

wherein the at least one antenna is connected to at least one electrical line, and the at least one electrical line is connected to a sensor and/or an actuator; and wherein the signals sent to the control unit (130) comprise sensor and/or actuator data.

* * * * *